Nov. 12, 1929.                    C. FROESCH                    1,735,425
                              VEHICLE CONSTRUCTION
                               Filed May 8, 1928            2 Sheets-Sheet 1
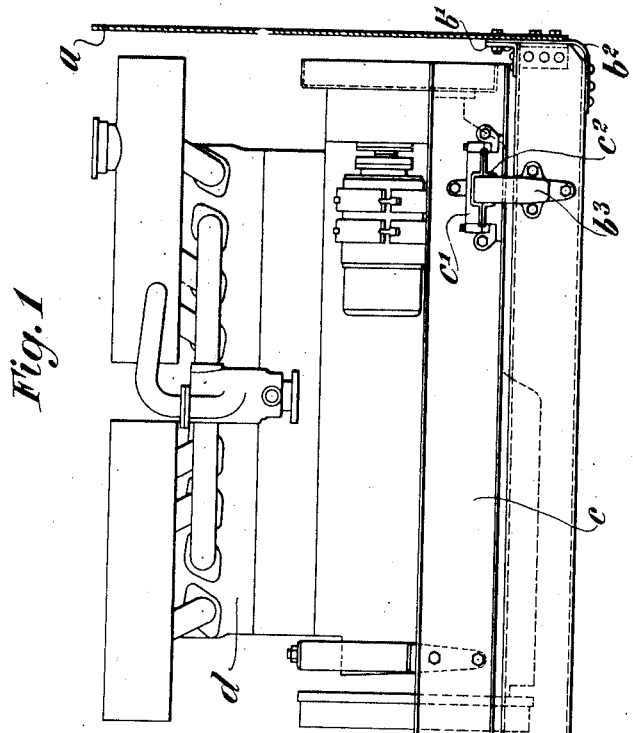
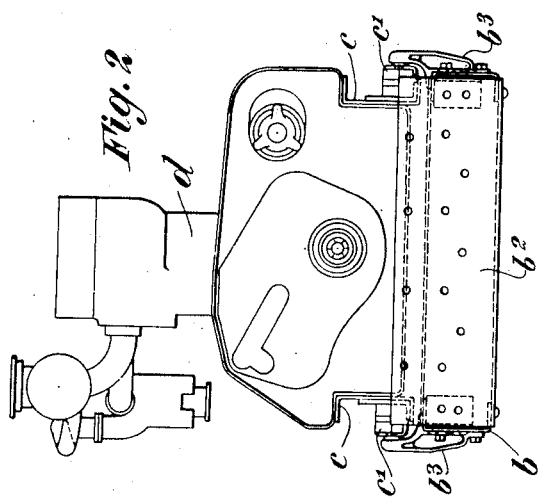
Inventor:
Charles Froesch,
By his attorneys
Redding, Greeley, O'Shea & Campbell Nov. 12, 1929.  C. FROESCH  1,735,425
VEHICLE CONSTRUCTION
Filed May 8, 1928   2 Sheets-Sheet 2
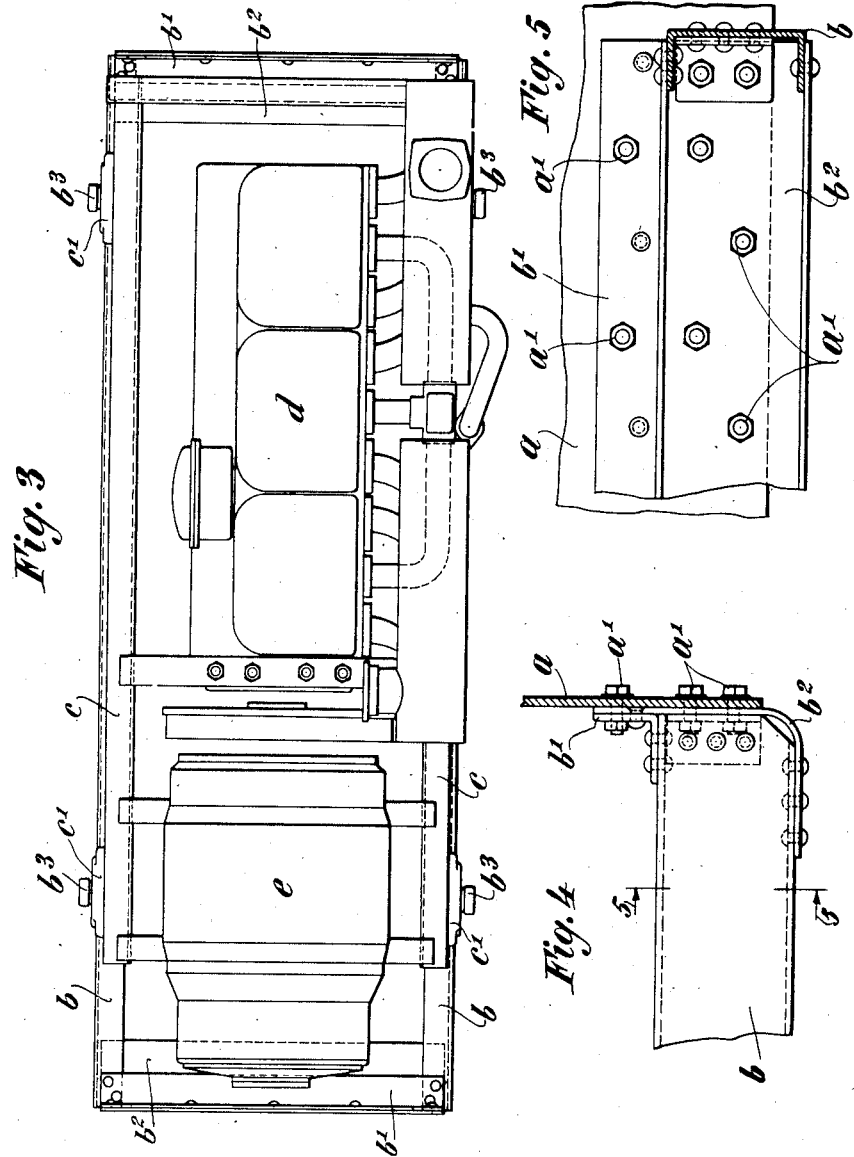
Inventor:
Charles Froesch,
By his attorneys
Redding, Greeley, O'Shea + Campbell Patented Nov. 12, 1929

1,735,425

UNITED STATES PATENT OFFICE

CHARLES FROESCH, OF TEANECK, NEW JERSEY, ASSIGNOR TO INTERNATIONAL MOTOR COMPANY, OF NEW YORK, N. Y., A CORPORATION OF DELAWARE

VEHICLE CONSTRUCTION

Application filed May 8, 1928. Serial No. 276,011.

This invention relates to constructions of vehicle bodies of the type carrying power units disposed transversely with respect to the longitudinal axis thereof. The particular feature embodied herein consists of a power unit comprising an internal combustion engine and an electric generator mounted upon a sub-frame which is disposed transversely at the rear of the vehicle. A main frame, or cradle member, carries the sub-frame and serves as a bracing and main body member which cooperates with the rest of the body structure to form the finished body.

An object of the invention, therefore, is to provide a mounting for a power unit of the type described above, which serves, not only as a cradle to carry the power unit, but also as one of the elements of the frame of the vehicle which contributes to the strength of the body.

Further objects and advantages will appear as the description of the invention proceeds and reference will now be had to the accompanying drawings, wherein:

Figure 1 is an end elevation, partly in section of the vehicle body, showing the power unit disposed transversely thereof.

Figure 2 is an end view of the power unit showing the manner in which it is carried by the main frame.

Figure 3 is a plan view of the power unit and main frame.

Figure 4 is a view, partly in section, showing in greater detail the manner in which the main frame which carries the power unit is mounted upon the vehicle.

Figure 5 is a view in section taken on line 5—5 of Figure 4, and looking in the direction of the arrows.

Referring to the above drawings, $a$ indicates the side plates of a vehicle body which is provided, at its rear, with a transverse cross frame construction $b$ formed rectangularly to carry a sub-frame $c$. The vehicle body, at its rear, is not provided with longitudinal channel members, but the sides $a$ are spaced and reinforced by the rectangular main frame construction $b$. In the form shown, angle plates $b'$, secured to the upper sides of the rectangular main frame $b$ and angle irons $b^2$, secured to the under sides of the rectangular frame, are bolted to the sides $a$ by means of bolts $a'$. It will be seen that upon removing the bolts $a'$, the power unit, together with the main frame $b$, may be slid rearwardly, or dropped downwardly, to remove it from the body.

The sub-frame $c$ carries an internal combustion engine $d$ and an electric generator $e$, the sub-frame being connected to the main frame through arms $b^3$ carried by the main frame and housings $c'$, carried upon the sub-frame $c$. Blocks of yielding non-metallic material $c^2$ are mounted within the housings $c'$ and engage the ends of the arms $b^3$ to mount the sub-frame yieldingly upon the main frame.

It will be seen that the present construction provides a mounting for the power unit which is readily removable in its entirety simply by the removing of the several bolts. In addition to this function, the structure which mounts the power unit in this manner also connects the elements of the body together and serves as a strengthening member for the body. The specific arrangement and construction of the elements thereof may be varied to suit the requirements of various installations, and the invention is not to be limited, save as defined in the appended claim.

I claim as my invention:

In combination with the sides of a vehicle body, a power unit disposed transversely of the vehicle body, a sub-frame carrying the unit, a main frame, means to mount the sub-frame on the main frame, and means to connect the main frame to the sides of the vehicle body at a plurality of points on each side adjacent the lower rear corners of the sides, whereby the main frame serves as the lower transverse bracing member for the body.

This specification signed this 1st day of May, A. D. 1928.

CHARLES FROESCH.